United States Patent
Han et al.

(10) Patent No.: US 7,193,814 B2
(45) Date of Patent: Mar. 20, 2007

(54) POLE PIECE FOR HIGH TRACK DENSITY RECORDING

(75) Inventors: Cherng-Chyi Han, San Jose, CA (US); Mao-Min Chen, San Jose, CA (US); Lei Zhang, San Jose, CA (US); Xiaomin Liu, Milpitas, CA (US)

(73) Assignee: Headway Technologies, Inc., Milpitas, CA (US)

( * ) Notice: Subject to any disclaimer, the term of this patent is extended or adjusted under 35 U.S.C. 154(b) by 403 days.

(21) Appl. No.: 10/780,514

(22) Filed: Feb. 17, 2004

(65) Prior Publication Data

US 2005/0180049 A1 Aug. 18, 2005

(51) Int. Cl.
*G11B 5/127* (2006.01)
*H04R 31/00* (2006.01)

(52) U.S. Cl. ............... 360/126; 29/603.07; 29/603.15

(58) Field of Classification Search ............... 360/125, 360/126, 317; 29/603.07, 603.13, 603.14, 29/603.15
See application file for complete search history.

(56) References Cited

U.S. PATENT DOCUMENTS

| | | | |
|---|---|---|---|
| 5,843,521 A * | 12/1998 | Ju et al. ............... | 428/336 |
| 6,342,311 B1 * | 1/2002 | Inturi et al. ............... | 428/815.2 |
| 6,574,854 B1 * | 6/2003 | Moran ............... | 29/603.15 |
| 6,594,112 B1 | 7/2003 | Crue et al. ............... | 360/126 |
| 6,621,659 B1 | 9/2003 | Shukh et al. ............... | 360/126 |
| 2002/0145824 A1 * | 10/2002 | Tabakovic et al. ............... | 360/126 |
| 2003/0137767 A1 * | 7/2003 | Chen et al. ............... | 360/71 |
| 2004/0101712 A1 * | 5/2004 | Kudo et al. ............... | 428/692 |
| 2005/0068675 A1 * | 3/2005 | Sasaki et al. ............... | 360/126 |
| 2006/0007602 A1 * | 1/2006 | Han et al. ............... | 360/317 |
| 2006/0158781 A1 * | 7/2006 | Sasaki et al. ............... | 360/126 |

FOREIGN PATENT DOCUMENTS

| | | | |
|---|---|---|---|
| JP | 2000195014 A | * | 7/2000 |
| JP | 2003006813 A | * | 1/2003 |

* cited by examiner

*Primary Examiner*—William J Klimowicz
(74) *Attorney, Agent, or Firm*—Saile Ackerman LLC; Stephen B. Ackerman

(57) ABSTRACT

For high track density recording, tighter reader and writer track width control are essential. This has been achieved by using a plated NiPd write gap which is self-aligned with a plated 23 KG pole material. Heat dissipation by the writer is thus improved since alumina has been replaced with non-magnetic metal materials, such as Ru, leading to less pole tip protrusion which in turn leads to better writer track width control

17 Claims, 7 Drawing Sheets

POLE PIECE FOR HIGH TRACK DENSITY RECORDING

FIELD OF THE INVENTION

The invention relates to the general field of magnetic write heads with particular reference to an improved top pole piece.

BACKGROUND OF THE INVENTION

For high track density recording, tighter reader and writer track width control is the key ingredient for obtaining high yield. How to continue improving the writer track width by using a pole trim process together with a narrow pole width is a challenging task. The basic principle to having tighter pole width control is to have a thinner pole resist process so that photo CD (critical dimension) control can be further improved. Reducing the amount of pole material consumed during the pole trim process, without impacting performance, is the key factor associated with using a thinner pole resist.

There have been several proposals to utilize a plated S2 (writer lower shield), a plated write gap, and a plated P2 (top pole) in a single photo process thereby minimizing the extent of pole trim consumption. However, with this scheme the throat height definition is rather poor so this type of design creates magnetic flux leakage between pole and shield. So poor overwrite is a consequence of this type of design.

The present invention discloses an improved scheme that applies to both stitched writers and planar writers.

A routine search of the prior art was performed with the following references of interest being found:

In U.S. Pat. No. 6,594,112, Crue et al. disclose NiPd plating to more accurately define throat height. Alumina is used as the insulating material. In U.S. Pat. No. 6,621,659, Shukh et al. show alumina in the recess to define throat height.

SUMMARY OF THE INVENTION

It has been an object of at least one embodiment of the present invention to reduce the amount of pole material consumed during pole trimming.

Another object of at least one embodiment of the present invention has been to facilitate use of thinner photoresist during formation of the top pole.

Still another object of at least one embodiment of the present invention has been to improve heat dissipation by the write head.

A further object of at least one embodiment of the present invention has been to provide a process to manufacture said write head.

These objects have been achieved by using a plated NiPd write gap and self-aligning with a plated 24 KG pole material. Heat dissipation by the writer is thus improved since alumina has been replaced with nonmagnetic metal materials, such as Ru, leading to less pole tip protrusion which in turn leads to better writer track width control.

DESCRIPTION OF THE PREFERRED EMBODIMENTS

In this invention we disclose a plated NiPd write gap and a plated 24 KG P2 in conjunction with a modified TH (throat height) definition method to overcome the poor TH definition problems associated with the prior art. The invention leads to a reduced amount of pole consumption by using a self-aligned plating process for the formation of the write gap and the top pole.

Figure 1:
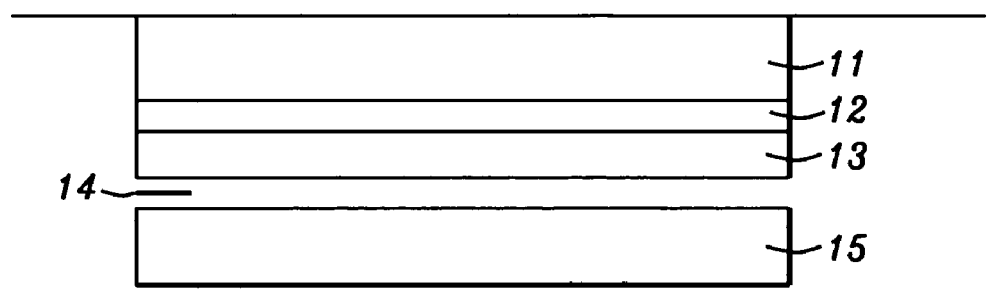
FIG. 1 shows the starting point for the construction of the present invention.

We begin a non-specific description of the present invention by referring to FIG. 1. Seen there is read head 14 which is sandwiched between its shields 13 and 15. Insulating layer 12 serves to isolate the top read shield 13 from lower write shield 11.

Figure 2:
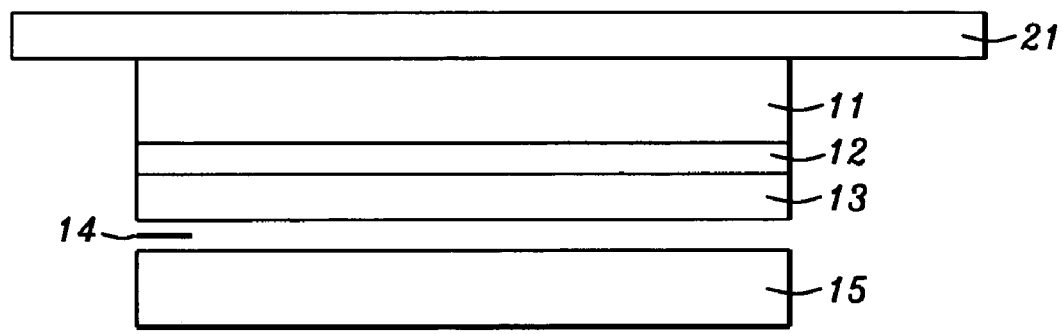
FIGS. 2 and 3 show how lower pole and back pieces are to be separated.
Figure 3:
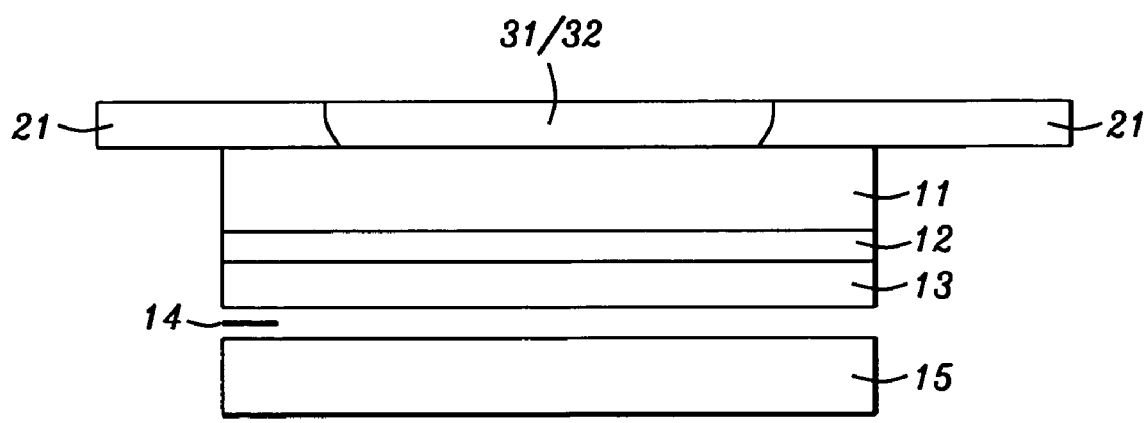

The method of the present invention begins, as shown in FIG. 2, with the deposition onto lower shield 11 of seed layer 21 which is characterized by having a magnetic moment of at least 24 kilogauss. Seed layer 21 could be CoFeN or CoFe and is deposited to a thickness between about 1,000 and 5,000 Angstroms. Then, as shown in FIG. 3, trench 31 is formed in seed layer 21. Trench 31 extends down as far as the top surface of shield 11 and has sloping sidewalls. The width of trench 31 will determine the throat depth of the writer.

Trench 31 is then just filled with layer of a non-magnetic metal 32 by means of sputtering. We have typically preferred ruthenium for metal 32 but other non-magnetic metals such as NiCu, Cu, Rh, or NiCr could also have been used.

Figure 4:
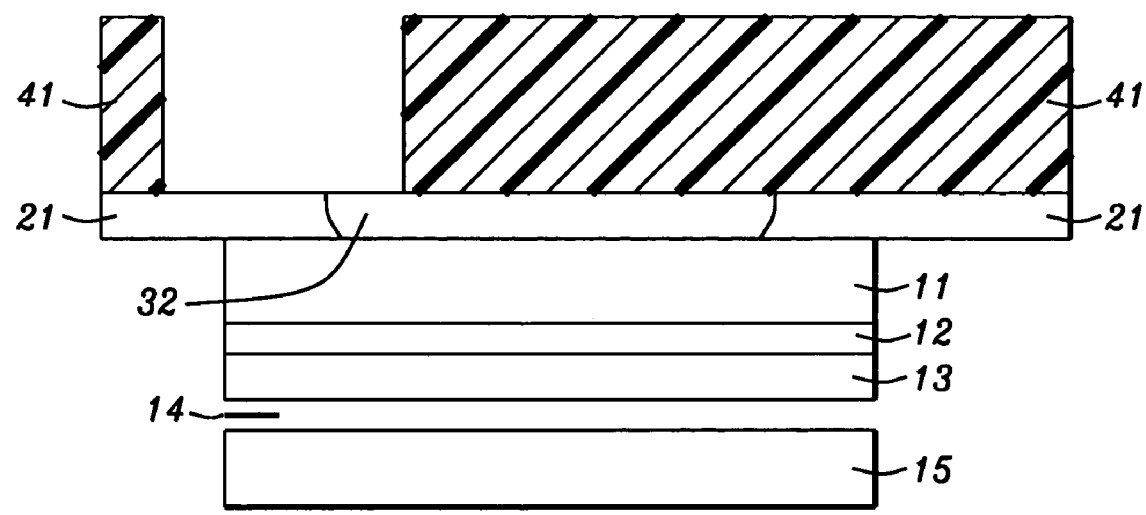
FIGS. 4 and 5 show the formation, in automatic alignment, of the write gap and the lower pole piece.
Figure 5:
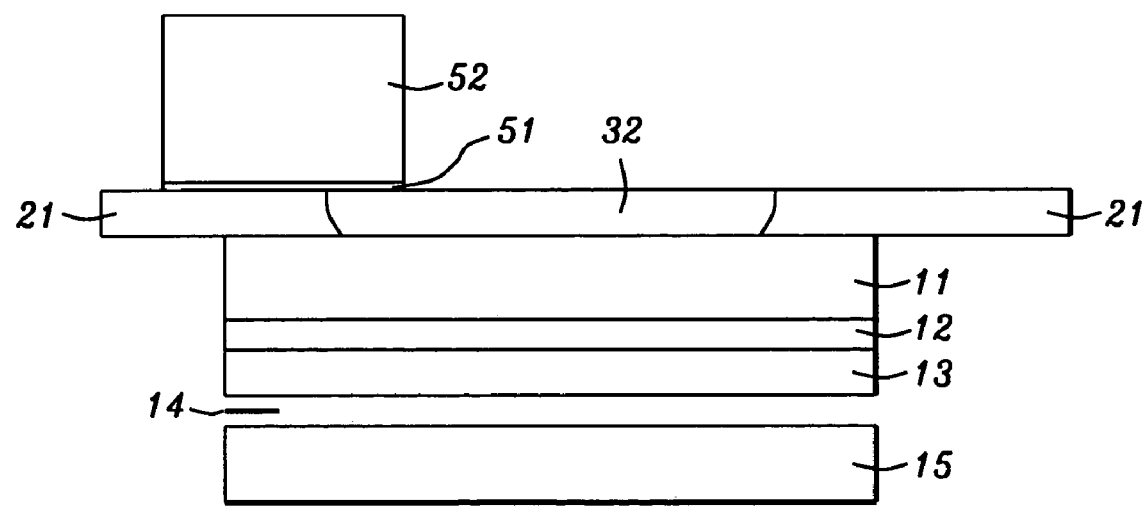

Referring now to FIG. 4, photoresist mold 41 is formed, as shown, and then write gap layer 51 is electroplated onto the floor of mold 41. Gap layer 51 is preferably NiPd but similar materials such as NiP or Pt could also have been used. It is deposited to a thickness between about 700 and 1,500 Angstroms. The mold is positioned so that write gap layer 51 overlaps both seed layer 21 and non-magnetic metal layer 32. Then, with the mold still in place, upper pole piece 52 is formed by electroplating onto write gap layer 51 (inside the mold). Upper pole piece 52 is made of a material such as CoNiFe and it is deposited to a thickness between about 2 and 4 microns. The structure, after removal of all photoresist is shown in FIG. 5.

Figure 6:
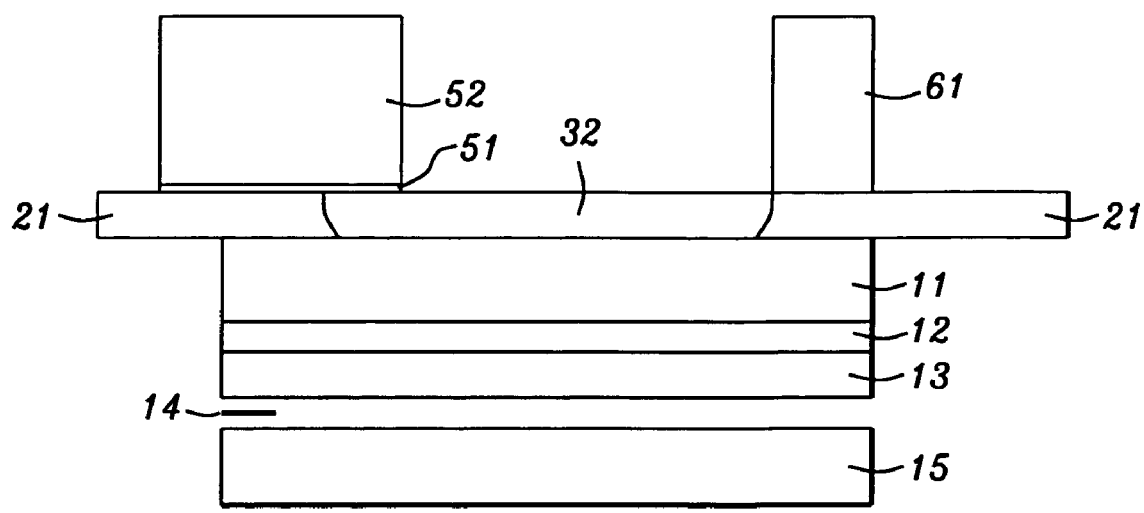
FIG. 6 shows formation of the end piece.
Figure 7:
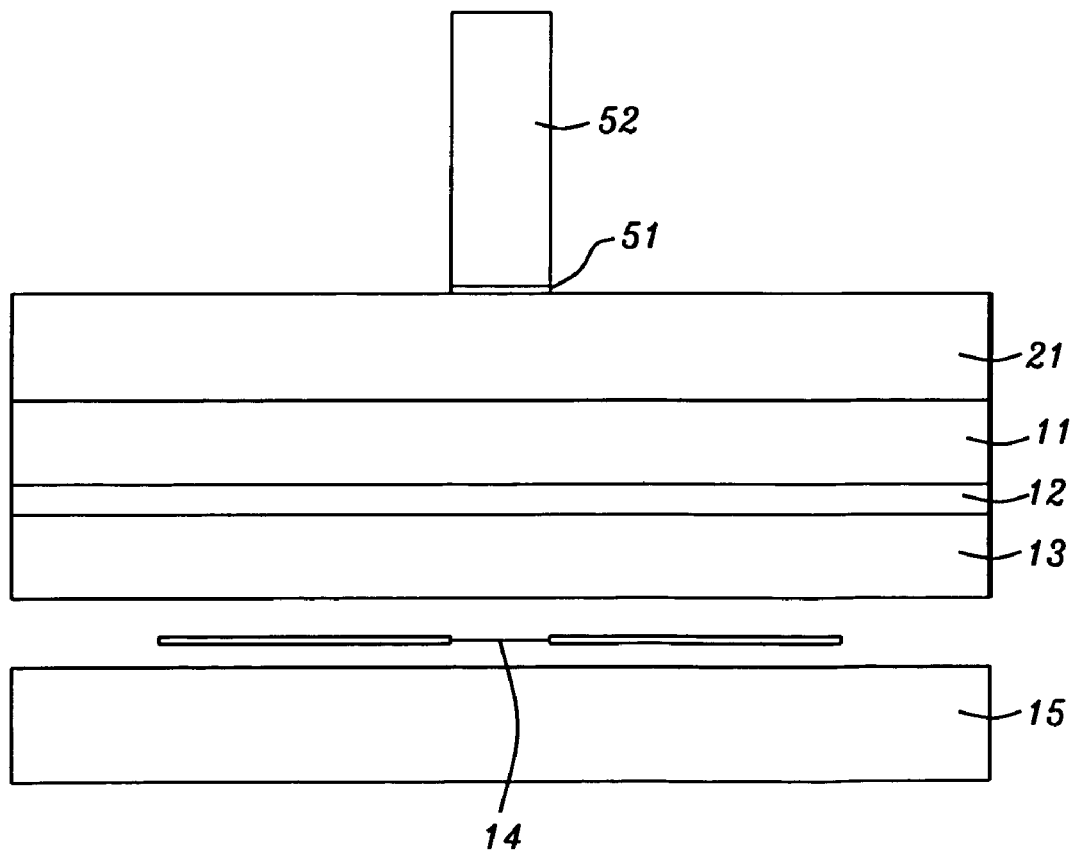
FIGS. 7 and 8 are ABS views of FIG. 6.
Figure 8:
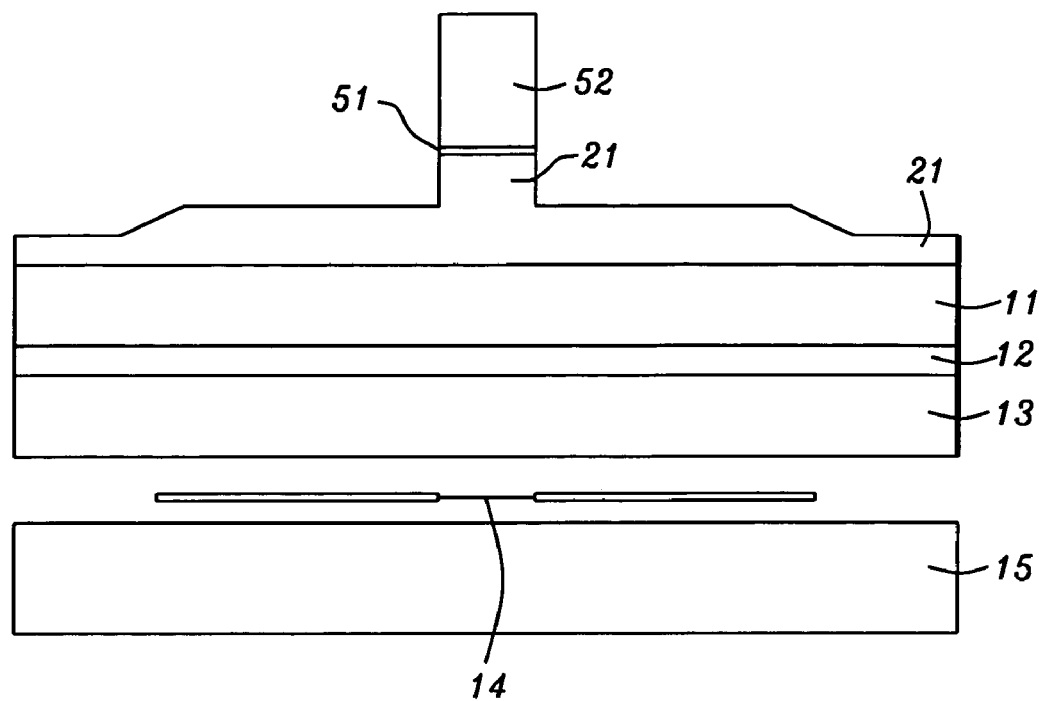

The general method concludes with the formation of back gap piece 61 that is in magnetic contact with seed layer 21 and with upper pole piece 52, said back gap piece not overlapping the write gap layer. FIGS. 7 and 8 are ABS (air bearing surface) views of FIG. 6 and of FIG. 6 after its left edge has been planarized.

We will now disclose a process for a more specific embodiment of the present invention namely a the manufacture of a planar write. As noted earlier, the process is of a more general nature can, in general, be applied to write heads of any shape or design.

Figure 9:
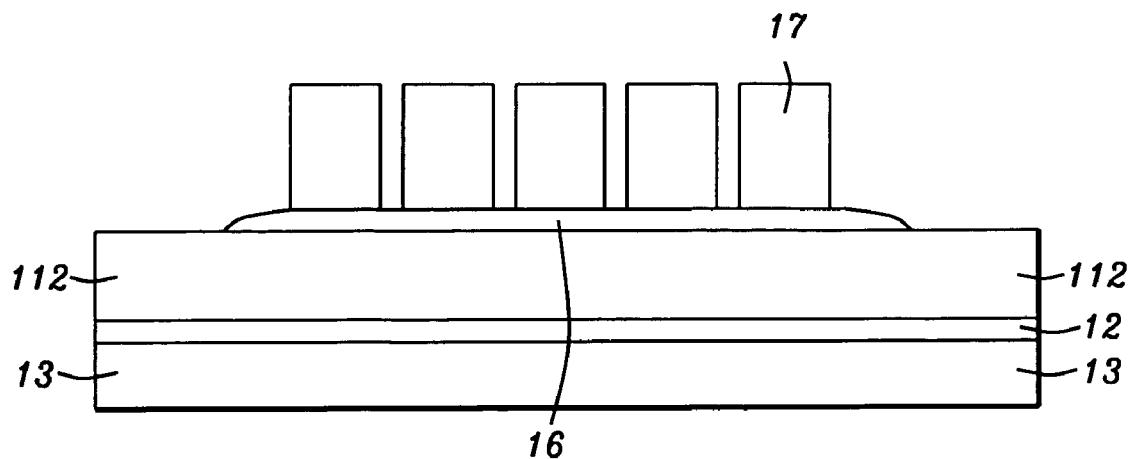
FIG. 9 shows the starting point for manufacturing a planar writer according to the teachings of the present invention.
Figure 10:
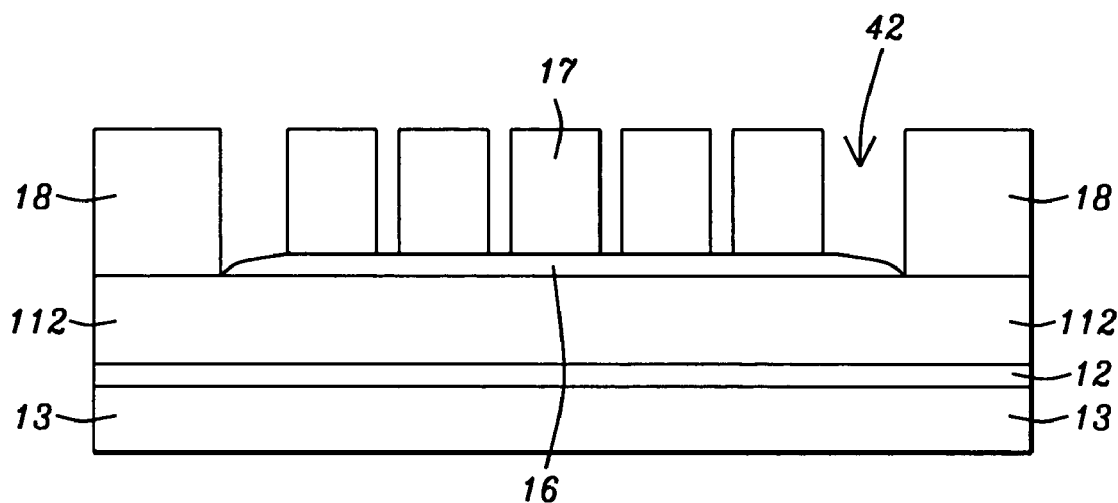
FIGS. 10–13 illustrate the formation of the write coils and the lower pole structure.

Referring now to FIG. 9, the process begins with the provision of lower magnetic shield layer 112 on which is formed dielectric disc 16. Lower coil 17 is then formed on disc 16. Then, as shown in FIG. 10, layer of ferromagnetic material 18 is deposited and patterned to form the bottom section of the lower pole which includes centrally located lower trench 42 on whose floor rests dielectric disc 16 and lower coil 17.

Figure 11:
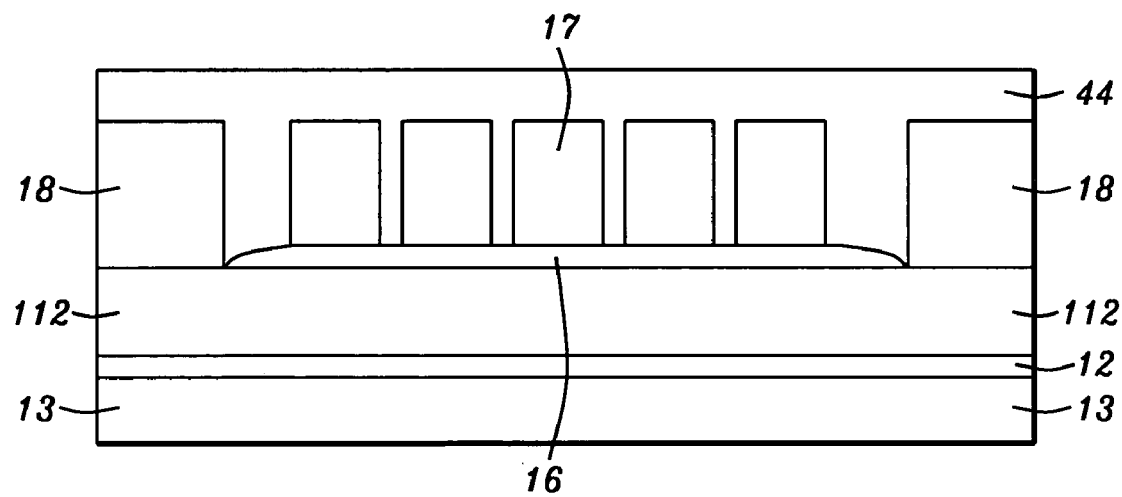
Figure 12:
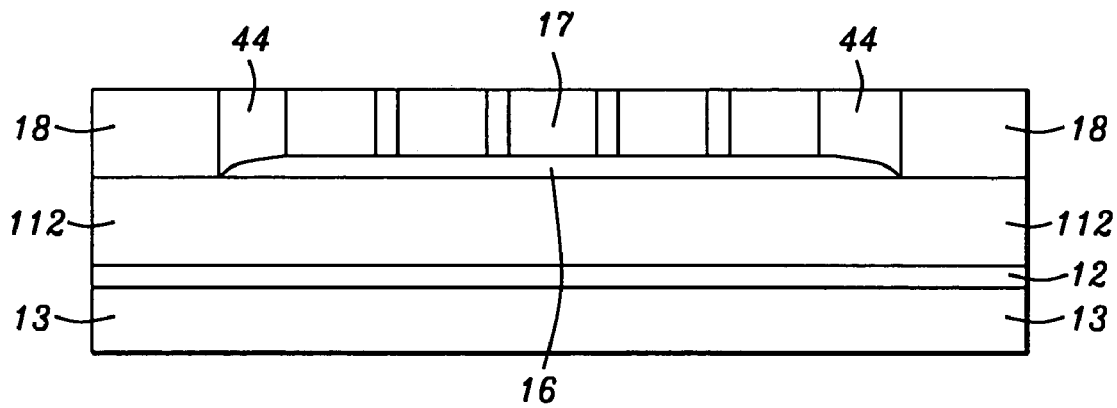
Figure 13:
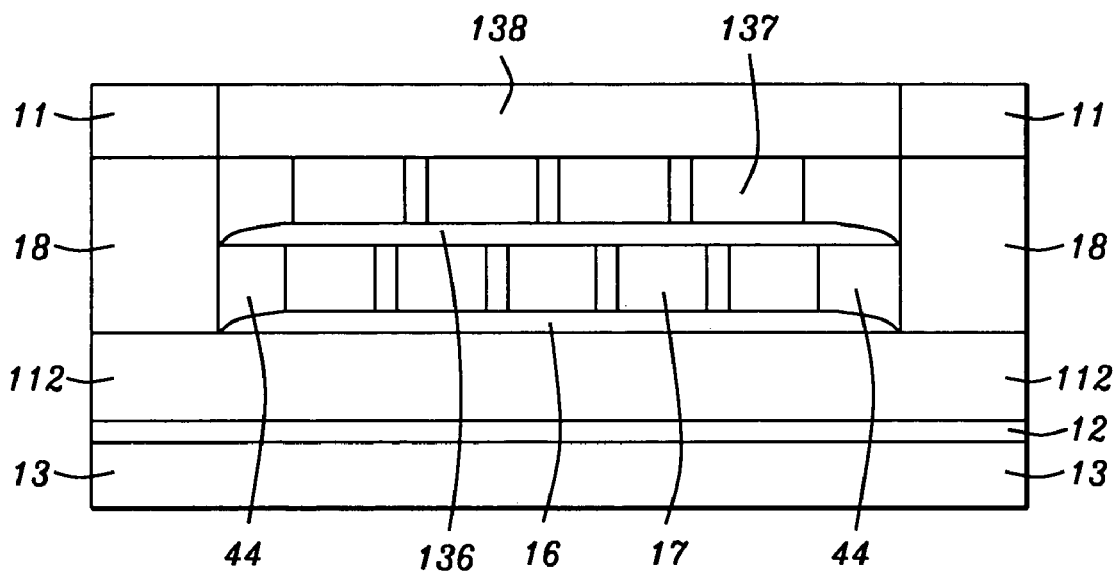

Then, as seen in FIG. 11, lower trench 42 is overfilled with insulating material 44 and then planarized, giving it the appearance seen in FIG. 12, following which insulating layer 136 is deposited and patterned to form a lid that fully covers lower coil 17 as seen in FIG. 13. Upper coil 137 is then formed on lid 136 and additional ferromagnetic material is deposited and patterned to complete formation of lower pole 18 which is then filled with insulation 138.

Figure 14:
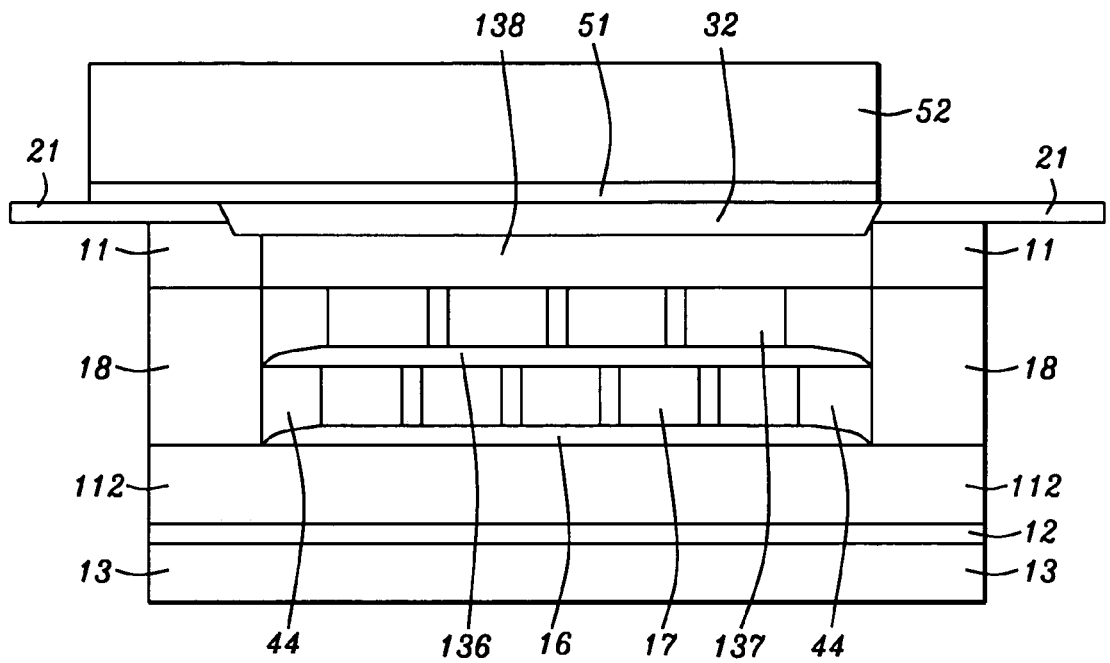
FIGS. 14 and 15 show the formation of the top pole and end piece.

The top (coplanar) surfaces of elements 11 and 138 in FIG. 13 are equivalent to the top surface of element 11 in FIGS. 1–5. From this point the formation of the planar reader proceeds along the line previously recited for the general method:

Seed layer 21, having a magnetic moment of at least 24 kilogauss, is deposited on the top surfaces of 11 and 138 and non-magnetic metal filled trench 32 is formed. Using a photoresist mold, as described earlier, top pole 52 is electroformed on write gap layer 51, said write gap layer overlapping both seed layer 21 and layer of a non-magnetic metal 32, as shown in FIG. 14.

Figure 15:
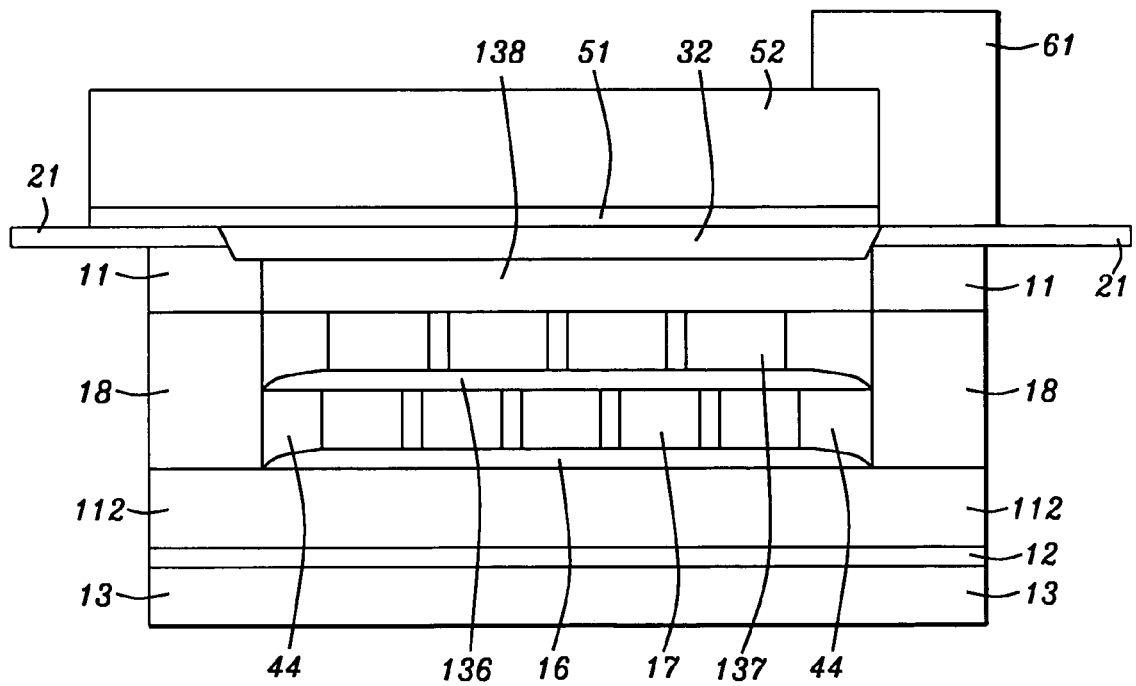

To complete the structure, back gap piece 61, that is in magnetic contact with the seed layer and with the upper pole piece and that does not overlap the write gap layer is formed, as shown in FIG. 15.

We conclude by noting that the present invention, as disclosed above, offers the following advantages:
1. Less P2 consumption due to self-aligned plated NiPd write gap and plated 24 KG pole material.
2. Thinner P2 resist can be used and tighter control, both within a single wafer and from wafer to wafer can be expected. A thinner resist allows greater photo-processing latitude (depth of focus, for example) which in turn leads to better P2 CD (critical dimension) control.
3. A modified TH definition process can further reduce the P2 consumption.
4. Heat dissipation by the writer is improved by replacing alumina with nonmagnetic metal materials, such as Ru, NiCu, Cu; etc (layer 32), leading to less pole tip protrusion
5. Better writer track width control.
6. A simplified writer process.

What is claimed is:

1. A method to form a magnetic write head for high track density applications, comprising:
   providing a lower pole piece that further comprises a write-coil in a coil well, said coil well being filled with insulation and having a top surface;
   depositing on said top surface a seed layer having a magnetic moment of at least 24 kilogauss;
   forming, in said seed layer, a trench that extends down as far as said top surface and that has sloping sidewalls;
   just filling said trench with a layer of a non-magnetic metal;
   forming, a photoresist mold whose floor is said seed layer and then electroplating, a write gap layer on said floor whereby said write gap layer overlaps both said seed layer and said layer of a non-magnetic metal;
   then forming, through electroplating onto said write gap layer, an upper pole piece and then removing all photoresist; and
   forming a back gap piece that is in magnetic contact with said seed layer and with said upper pole piece and that does not overlap said write gap layer.

2. The method described in claim 1 wherein said seed layer is selected from the group consisting of CoFeN and CoFe.

3. The method described in claim 1 wherein said seed layer is deposited to a thickness between about 1,000 and 5,000 Angstroms.

4. The method described in claim 1 wherein said layer of non-magnetic metal is selected from the group consisting of Ru, NiCu, Cu, and NiCr.

5. The method described in claim 1 wherein said write gap layer is selected from the group consisting of NiPd and NiP.

6. The method described in claim 1 wherein said write gap layer is deposited to a thickness between about 700 and 1,500 Angstroms.

7. The method described in claim 1 wherein said upper pole piece is CoNiFe.

8. The method described in claim 1 wherein said upper pole piece is deposited to a thickness between about 2 and 4 microns.

9. A process to manufacture a planar magnetic write head, comprising:
   providing a lower magnetic shield layer;
   forming a disc of dielectric material on said lower magnetic shield a layer;
   forming, on said disc, a lower coil;
   depositing and then patterning a first layer of ferromagnetic material to form a bottom section of a lower pole, having a top surface, that includes a centrally located lower trench on whose floor rest said dielectric disc and lower coil;
   overfilling said lower trench with a first layer of insulating material and then planarizing so that said filled trench has an upper surface that is coplanar with the upper surface of said lower pole bottom section;
   depositing, and then patterning, a second insulating layer to form a first lid that fully covers said lower coil and said lower trench;
   forming, on said first lid, an upper coil;
   depositing and then patterning a second layer of ferromagnetic material thereby completing formation of the lower pole, including a top surface and a centrally located upper trench on whose floor rest said first lid and said upper coil;
   depositing on said top surface a seed layer having a magnetic moment of at least 24 kilogauss;
   forming, in said seed layer, a trench that extends down as far as said top surface and that has sloping sidewalls;
   just filling said trench with a layer of a non-magnetic metal;
   forming, a photoresist mold whose floor is said seed layer and then electroplating, a write gap layer on said floor whereby said write gap layer overlaps both said seed layer and said layer of a non-magnetic metal;
   then forming, through electroplating onto said write gap layer, an upper pole piece and then removing all photoresist; and
   forming a back gap piece that is in magnetic contact with said seed layer and with said upper pole piece and that does not overlap said write gap layer.

10. The process recited in claim 9 wherein said lower magnetic shield layer is a top shield of a magnetic read head.

11. The process recited in claim 9 wherein said seed layer is selected from the group consisting of CoFeN and CoFe.

12. The process recited in claim 9 wherein said seed layer is deposited to a thickness between about 1,000 and 5,000 Angstroms.

13. The process recited in claim 9 wherein said layer of non-magnetic material is selected from the group consisting of Ru, NiCu, Cu, and NiCr.

14. The process recited in claim 9 wherein write gap layer is selected from the group consisting of NiPd and NiP.

15. The process recited in claim 9 wherein said write gap layer is deposited to a thickness between about 700 and 1,500 Angstroms.

16. The process recited in claim 9 wherein said upper pole piece is CoNiFe.

17. The process recited in claim 9 wherein said upper pole piece is deposited to a thickness between about 2 and 4 microns.

* * * * *